Patented Sept. 3, 1940

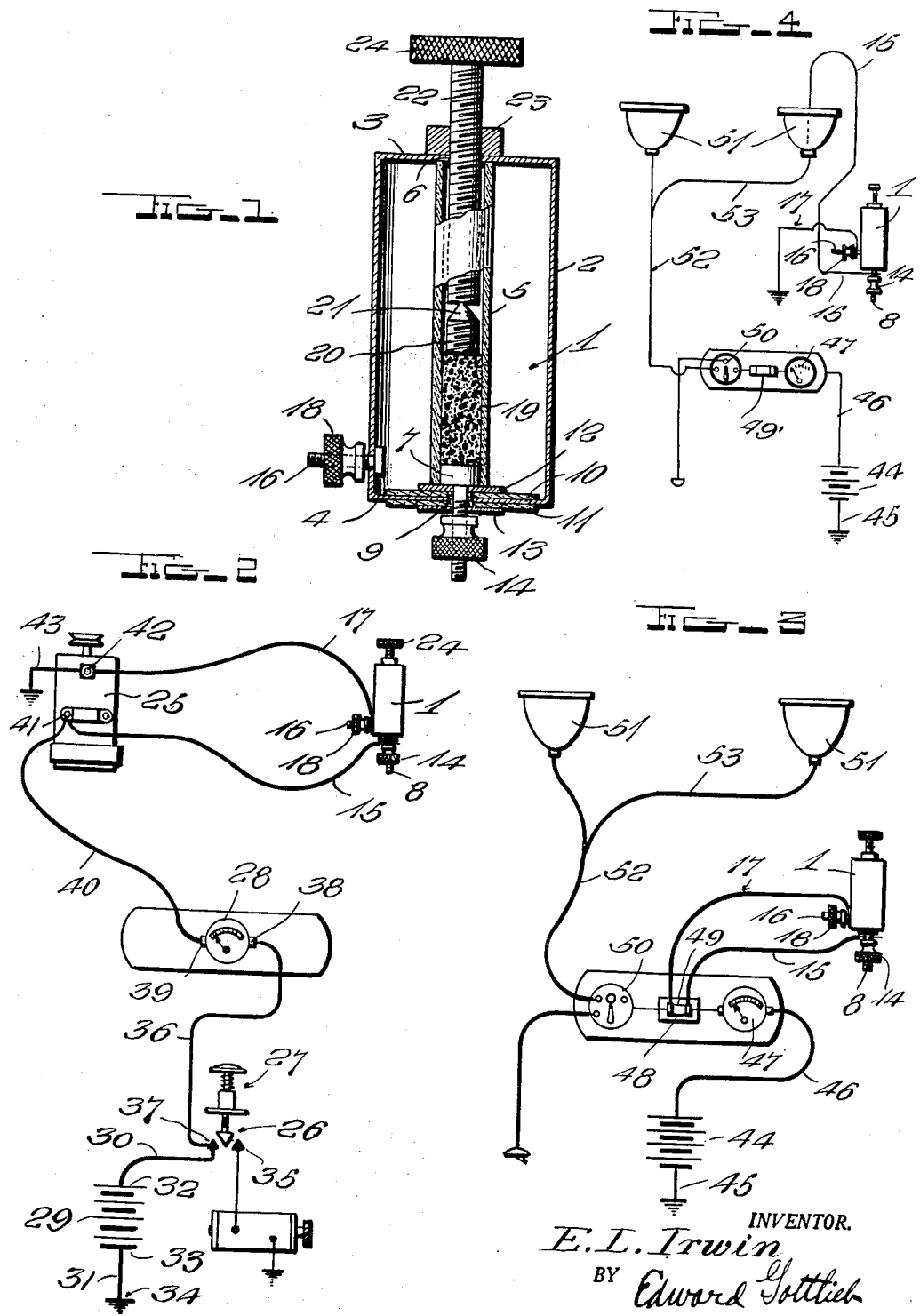

2,213,632

UNITED STATES PATENT OFFICE 2,213,632

CIRCUIT TESTER

Edward L. Irwin, Lewiston, Idaho

Application September 26, 1938, Serial No. 231,786

3 Claims. (Cl. 201—50)

This invention relates to a circuit tester which is particularly adapted for testing the circuits of the ignition and lighting systems of automobiles.

One object of the invention is to provide a circuit tester which may be hooked into the circuit for an electric starter or the lights of an automobile and the amperage raised to such a point that heat will be generated at terminals or connections which are defective or about to go bad, thus making it merely necessary to place a hand upon the terminals for a heat test in order to determine the location of a defect in a circuit which does not function properly when a switch is closed.

Another object of the invention is to so form the tester that by adjusting it, the rise in amperage may be controlled and not only raised as high as desired, but prevented from becoming too great for the capacity of the ammeter of the circuit.

Another object of the invention is to provide a tester so constructed that while the amperage may be raised as high as desired, overheating of the casing of the tester will be prevented and the operator conducting the test prevented from being burned and equipment or other portions of an automobile damaged by contact with the tester.

Another object of the invention is to provide a tester which is of simple construction, easy to operate, and not liable to get out of order or be damaged by a careless workman.

The invention is illustrated in the accompanying drawing wherein:

Fig. 1 is a sectional view taken vertically through the tester.

Fig. 2 is a wiring diagram showing the tester used for testing the starter circuit of an automobile.

Fig. 3 is a wiring diagram showing the tester used for testing the light circuit of an automobile.

Fig. 4 is a wiring diagram showing another way of testing the light circuit with the improved tester.

This improved circuit tester which is indicated in general by the numeral 1 is very compact and of such size that it may be conveniently carried from one place to another when used and stored in a small space when not in use. The case 2 of the tester is formed of conductive metal and is of cylindrical shape and provided with a top 3 and a bottom 4. A tube 5 which may be formed of insulating material such as porcelain or formed of steel or other metal and lined with mica extends longitudinally through the casing centrally thereof with its upper end disposed about an opening 6 formed centrally of the top 3. The lower end of the tube fits snugly about the head 7 of a terminal screw 8 and this screw extends out through the bottom 4 centrally thereof. A small sleeve 9 of insulation fits around the screw with its ends projecting from inner and outer surfaces of the bottom and about these projecting end portions of the sleeve 9 are disposed mica washers 10 and 11 which bear against the bottom. There have also been provided metal washers 12 and 13 which bear against the mica washers and ends of the insulating sleeve 9 and when the nut 14 is tightened the terminal screw will be firmly held in place and a lead wire 15 may be firmly bound to the terminal screw. By this arrangement, the terminal screw will be firmly held in place in insulated relation to the casing and its head will fit snugly in the lower portion of the tube 5. A second terminal screw 16 for engagement by a wire 17 which may serve as a ground wire is passed through an opening formed near the bottom of the casing through one side thereof and when the binding nut 18 is tightened, the wire 17 will be firmly secured and grounded to the wall of the casing.

A plug or mass of crushed carbon 19 fills the lower portion of the tube 5 and upon this carbon rests a plunger 20 which fits loosely within the tube and has a tapered upper end or tip 21. This plug is engaged by the lower or inner end of a metal stem or adjusting screw 22 which is threaded through a nut 23 welded upon the top 3 about the opening 6. A turning head or knob 24 of composition or other insulating material is carried by the outer end of the screw 22 and has its marginal edge roughened so that it may be firmly grasped and the screw easily turned. The screw may thus be easily adjusted to apply necessary pressure to the tapered end of the plunger 20 and force the plunger into tight pressing engagement with the carbon. By adjusting the screw and consequently the pressure applied to the carbon, the resistance may be regulated and the amperage of a circuit controlled.

When this tester is used to test the circuit of the starter of an automobile, it is installed as shown in Figure 2. In this circuit, there have been shown a generator 25, a starter switch 26 having the usual foot-operated closing plunger 27 and an ammeter 28 together with a battery 29. Terminals of the wires 30 and 31 are connected with the battery as shown at 32 and 33, the wire 33 being grounded as shown at 34 and the wire 30 having its other end connected with the starter switch as shown at 35. A wire 36 has its ends connected with terminals of the switch 26 and one side of the ammeter 28 as shown at 37 and 38. To the terminal 39 at the other side of the ammeter is secured one end of a wire 40 which has its other end secured to the terminal 41 of the generator and to this terminal 41 is also secured the lead wire 15 of the tester. The other lead wire 17 of the tester is secured to the terminal 42 of the generator to which the ground wire 43 is secured. Before the tester is applied, the amperage developed in the circuit is not over 20 amperes when the switch is closed but when the lead wires 15 and 17 are secured to the terminals of the generator as shown, the amperage will be raised to from 20 to 50 amperes. This is two or three times the normal amperage and the heat developed will be from 500° F. to around 1800° F. or even higher. This excessive heat would normally melt the wires of the circuit but with the tester hooked into the circuit and the screw 22 adjusted to regulate the amperage so that it does not exceed the capacity of the ammeter no damage will be done. Where good connections are provided at terminals of the wires, no heat will be felt but if a connection is defective, or about to go bad, heat will develop and when the operator places a hand or his fingers against a terminal where a defective connection exists, heat will be felt. It will thus be seen that reading of meters or other electrical apparatus is eliminated and rise in temperature alone depended upon to detect a defective terminal. The circuit may, therefore, be easily and quickly tested by either a skilled workman or an inexperienced person. The air in the casing serves as an insulation for heat and prevents the walls of the casing from becoming too hot to be easily handled or being liable to scorch a cushion or other portion of an automobile if placed thereon. The fact that the plug 20 has its upper end tapered to a point also serves to reduce to a minimum the area of contact between the plug and the inner end of the screw 22 and thus prevent transmission of heat through the adjusting screw.

A lighting circuit may be tested as shown in Fig. 3 or as shown in Fig. 4. In this circuit, the battery 44 is grounded at one side by a wire 45 and the wire 46 leading from the other side of the battery is secured to one side of the ammeter 47, the same as in Fig. 2. A fuse block 48 carrying a removable fuse 49 is disposed in the circuit between the ammeter and the light switch 50 and the sockets of the head lights 51 are connected with the switch by a wire 52 having a branch wire 53 leading therefrom. When this circuit is tested as shown in Fig. 3, the lead wires 15 and 17 are connected with the fuse block as shown and the switch then closed so that flow of current will be established. If no heat is developed at the wire terminals, it will indicate that there is no defects in the circuit but if any of the terminals are defective, heat will be noticed when the terminals are touched with a hand. When the light circuit is tested as shown in Fig. 4, the fuse 49 is removed and a copper tube 49' substituted. One lead wire of the tester is connected with a headlight socket and the other lead wire grounded as shown. The switch may then be closed and if heat is developed, it will indicate defective terminals.

From the foregoing description of the construction of my improved device, the operation thereof and the method of applying the same to use, will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

Having thus described the invention what is claimed is:

1. A circuit tester comprising a hollow metal casing having heads at its upper and lower ends, a terminal post secured through the head at the lower end of said casing in insulated relation thereto and having a head at its inner end, a second terminal post secured through a wall of said casing in conductive engagement therewith, an insulating tube extending longitudinally through said casing with its lower end fitting snugly about the head of the first post and its other end abutting the head at the upper end of the casing about an opening formed therein, a nut carried by the upper head of said casing about said opening in conductive engagement with the head of the casing, a mass of crushed carbon in said tube resting upon the head of the first post, a metal plunger loose in said tube and resting upon said carbon and having its upper end tapered, and an adjusting screw of conductive material threaded through said nut and extending into said tube in spaced relation to walls thereof with its inner end bearing against the tapered end of said plunger.

2. A circuit tester comprising a hollow metal casing having upper and lower heads closing its ends, a tube of insulation extending through said casing between the heads thereof, air in the casing about said tube constituting heat insulating means, a terminal screw extending through an opening in the lower head of the casing and having a head at its inner end disposed in the lower portion of said tube, washers of insulation fitting about said screw and bearing against inner and outer faces of the lower head to hold the screw in insulated relation to the casing, a mass of crushed carbon in the lower portion of said tube resting upon the head of said terminal screw, a metal plunger in said tube having a flat lower end resting upon said carbon and a conical upper end, an adjusting screw of conductive material threaded through the upper head and extending through said tube with its inner end engaging the apex of the conical upper end of said plunger, and a second terminal screw secured through a portion of the casing in conductive engagement therewith.

3. A circuit tester comprising a hollow cylinder of conductive material closed at its ends, an insulating tube extending through said casing between ends thereof, air in the casing about said tube constituting heat insulating means, a terminal screw secured through one end of said casing in insulated relation thereto with its inner end enclosed in one end of said tube, carbon in said tube engaging said terminal screw, a metal plunger loose in said tube and resting upon said carbon, an adjusting screw of conductive material threaded through the other end of said casing and extending into said tube with its inner end engaging said plunger and applying pressure to the plunger to compress the carbon, and a second terminal screw secured through a portion of said casing in conductive engagement therewith.

EDWARD L. IRWIN.